Figure 4:
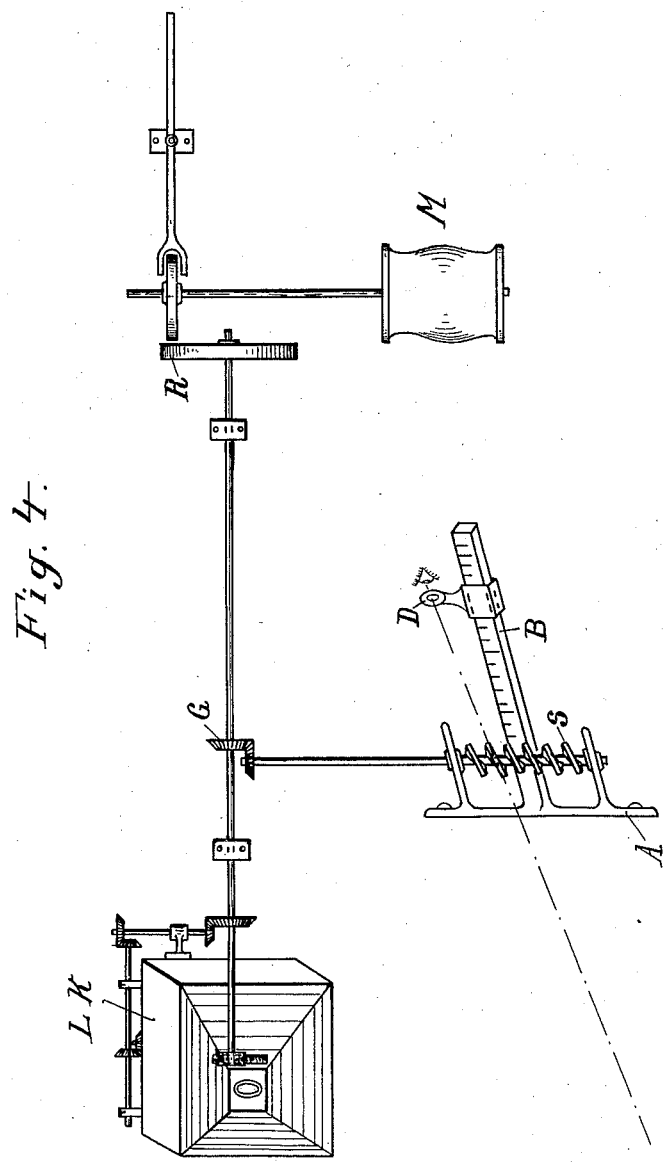

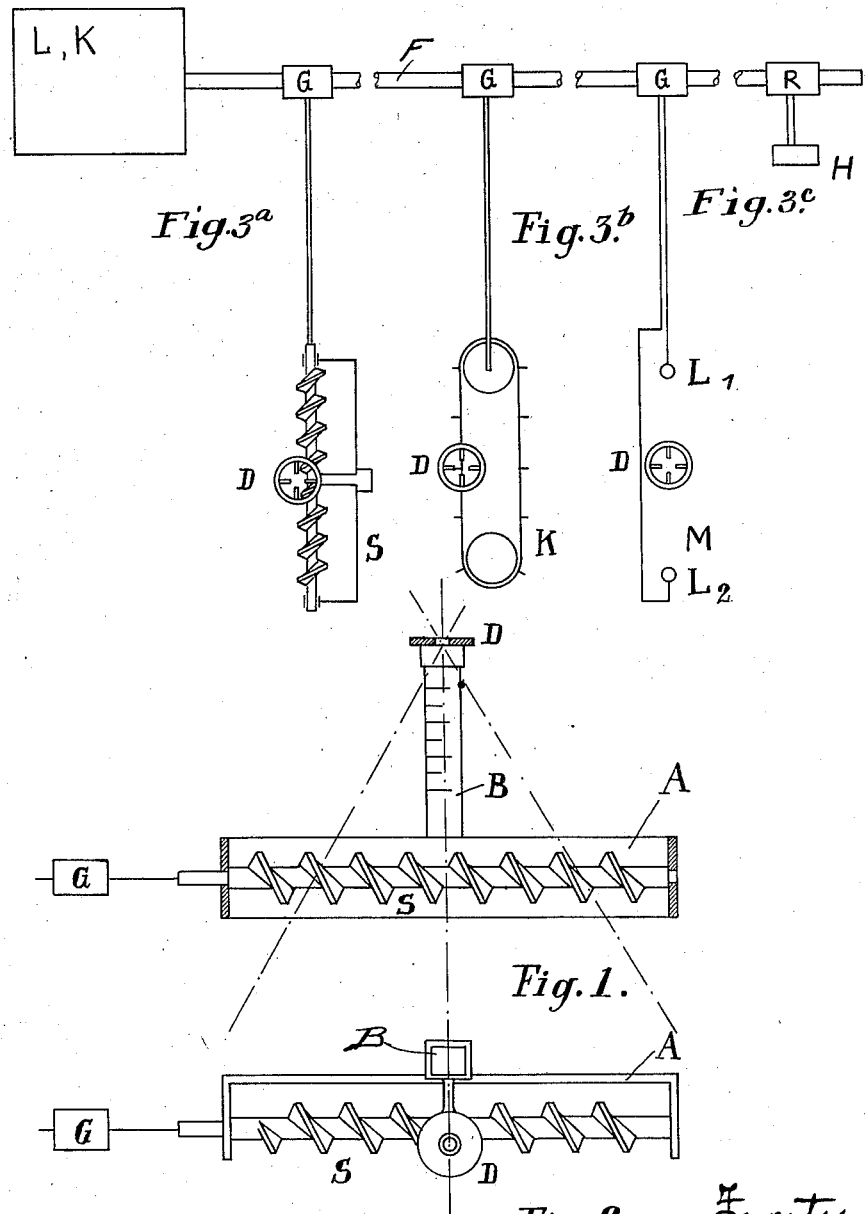

Aug. 4, 1925.

J. W. LUDOWICI 1,548,723

DEVICE FOR TAKING SERIAL PICTURES FROM AIRCRAFT

Filed June 26, 1922     2 Sheets-Sheet 2

INVENTOR:

Johann Wilhelm Ludowici by *(signature)*

Attorney.

Patented Aug. 4, 1925.

1,548,723

UNITED STATES PATENT OFFICE.

JOHANN WILHELM LUDOWICI, OF MUNICH, GERMANY.

DEVICE FOR TAKING SERIAL PICTURES FROM AIRCRAFT.

Application filed June 26, 1922. Serial No. 571,034.

*To all whom it may concern:*

Be it known that I, JOHANN WILHELM LUDOWICI, a citizen of Germany, residing at Munich, Germany, have invented certain new and useful Improvements in Devices for Taking Serial Pictures from Aircraft, of which the following is a specification.

My invention has reference to means of taking serial photographic pictures from air craft, and it is intended to generally improve and perfect devices of this kind, and to provide novel means for the taking of an uninterrupted succession of pictorial representations irrespective of the altitude in which the air craft is sailing.

The taking of an uninterrupted succession of photographic pictures of a section of ground from air craft of any kind has been effected heretofore by individual pictures of successive portions of the respective section of ground in time intervals which had to be ascertained in accordance with the altitude and the flying speed, and by the subsequent serial connection of these individual pictures.

Heretofore the time intervals for such individual photographic pictures have been ascertained by calculation from the altitude and the speed of propulsion. Inasmuch, however, as it is impossible to exactly determine both the altitude as well as the speed with exactness, and in view of their being subject to constant fluctuations it is obvious that this procedure of determining the data by calculation was bound to yield unsatisfactory results.

My invention is distinguished from this previous state of the art by providing means for the automatic adjustment of the successive times of photographing in accordance with the particular flying speed and the altitude relatively to the ground of which the picture is to be taken, and with this particular object in view and for the purpose of realizing other important advantages and novel purposes my invention provides for the fixing of the position of the eye of the observer by means of a dioptric relatively to an indicator or the like, a migrating mark for instance, arranged at right angle to the line of sight and at a certain distance therefrom. By means of a device of this kind any suitable point of the ground is sighted beyond the migrating mark situated at one side of its path, whereupon provision is made to keep the three points represented by the dioptrics, or the eye of the observer, the migrating mark and the sighted point of the ground always in alinement during the relative movement of the flying craft relatively to the sighted point of the ground by means of providing for an advancing velocity of the migrating mark in accordance with the speed of the air craft. The advancing speed of the migrating mark bears a certain definite ratio to the relative movement of flight with relation to the ground to be covered, and the value of this ratio is determined by the ratio of the distance of the dioptric from the migrating mark to the distance of the dioptric from the sighted point of ground, inasmuch as the angular velocity remains the same. By providing for a mechanical connection with the closing means for the photographic camera and the plate changing member to be governed by the speed of displacement of the migrating mark, it is possible to arrive at the desired object of providing for a time regulated succession of the uncovering of the camera in accordance with the sectional portion of the ground covered by the craft. The time intervals of the uncovering of the camera are not only governed by the varying speed of flight, but also in accordance with the changing altitude.

In order to arrive with certainty at an uninterrupted succession of individual photographic pictures the said pictures are caused to overlap each other in the usual manner for a certain fraction of the total length of the plates. The magnitude of the overlapping is regulated to accord with the object to be accomplished; but it is comparatively small at any rate, and should be kept uniform, so as to reduce as much as possible to a minimum the number of the plates required for the total photographic operation. By a corresponding selection of the ratio of transmission for the movement of the migrating mark to the driving mechanism for the uncovering of the camera closing means, and for the plate changing instrumentalities the ratio of overlapping may be exactly adjusted.

The same object is also accomplished by making the distance adjustable between the dioptric and the migrating mark. My invention will be more clearly explained with the aid of the accompanying drawing, showing several embodiments of the principle of my invention by way of example.

Fig. 1 is a device according to my invention shown in side view; Fig. 2 is a top plan view of the same.

Figs. 3ª, 3ᵇ, and 3ᶜ illustrate the device provided with three different kinds of migrating marks.

Fig. 4 is another diagram disclosing the device as actually arranged.

Within a frame A a migrating mark S is arranged, which in the present example consists of a worm, which should be operated at such speed that a certain winding of the worm will always become situated in the sighting line of the point of ground selected. Upon the frame A a connecting piece B is mounted for use in connection with the migrating mark upon which a dioptric D or the like is adapted to be displaced in any suitable manner along a graduated scale which indicates the magnitude of the overlapping of the individual pictures as percentages of the length of the plates or of the pictures at the particular distance of the dioptric from the migrating mark. The worm S is operated by means of a gear G from the driving shaft of the closing device for the camera and for the changing of the plates or films.

The gearing G may be of any well known kind for transmitting rotary motion at right angles, such as a pair of cog wheels or a worm gear. According as one chooses the ratio of transmission of the worm, the number of revolutions of driving shaft F will be proportionate to those of the shaft driving the migrating mark.

Shaft F driving the operating means of the camera L K is driven either manually by aid of a crank or with the aid of suitable gearing allowing to insert at will different ratios of gearing, for instance a train of gear wheels, by aid of the handle H, in order to be able to regulate by hand the velocity of the migrating mark so as to permanently keep this latter in the sighting line. From shaft F there is derived by means of the gearing G the means for driving the migrating mark. Shaft F extends as far as the camera shutter and the plate or film changing means.

The migrating marks shown in Figs. 3ª, 3ᵇ, and 3ᶜ are each connected with the shaft F by gearing indicated diagrammatically at G.

The mark shown in Fig. 3ª is substantially the same as that shown on a larger scale in Figs. 1 and 2. In Fig. 3ᵇ the migrating marks are arranged at predetermined distances on an endless band K running over two sheaves.

In Fig. 3ᶜ $L_1$ and $L_2$ are two lamps arranged at a predetermined distance from one another and which are lighted and extinguished by suitable contacts on passing the sighted point.

The device as illustrated diagrammatically in Figs. 3ª, 3ᵇ and 3ᶜ need of course only be provided with one of these systems of migrating marks.

It is obvious that the general principles of my invention may be embodied in various other forms and pieces of apparatus susceptible of operation in connection with migrating marks and with controlling means for the camera and similar picture taking devices, and I wish it to be understood that I may use ordinary lenses prisms or the like instead of dioptrics, and that my invention is capable of various alterations and modifications to become adapted to various conditions of use and to suit the convenience of the operator and without deviating from the principle of my invention, as clearly set forth in the claims.

I claim:

1. Means for producing successive serial pictures, comprising a photographic camera, means for operating said camera, a migrating mark and light concentrating and sighting means arranged opposite to and connecting said mark to said camera operating means.

2. Means for producing serially succeeding pictures of portions of ground and the like, comprising a movable member, a mark on said member, a camera, controlling means for the camera, sighting and light concentrating and directing means, substantially opposite said mark moving means, and means for operatively connecting said mark moving means to the controlling means of said camera.

3. Device for the production of serially succeeding partially overlapping pictures, comprising a camera, controlling means for said camera, a movable member, a migrating mark on said member, light concentrating, and directing means substantially opposite said migrating mark and in spaced relation thereto, means to adjust the distance of said light directing means from said movable member, and means operatively connecting said movable member to said camera controlling means.

4. Device for the production of serially succeeding partially overlapping pictures, comprising a camera, controlling means for said camera, light concentrating and light directing means, a movable member in spaced relation to said light directing means, and substantally opposite thereto, means operatively connecting said movable member to said camera controlling means, and speed regulating means operatively connected to said camera controlling means and to said movable member.

5. In a device for the production of serially succeeding pictures of a distant object, worm moving means for said worm, a sighting mark on said worm, light concentrating and directing and sighting means opposite said worm and adjustably spaced therefrom, a camera, controlling means for said camera, and means operatively connecting said worm moving means to said camera controlling means, and speed regulating means operatively connected to said worm moving means.

In testimony whereof I affix my signature.

JOHANN WILHELM LUDOWICI.